United States Patent Office 3,720,665
Patented Mar. 13, 1973

3,720,665
ACYLOXYMETHYL ESTERS OF ALPHA-PREIDO-CYCLO-HEXADIENYLALKYLENE-PENICILLINS
Arnold D. Welch, Princeton, Joseph Edward Dolfini, North Brunswick, and Frederick F. Giarrusso, Belle Mead, N.J., assignors to E. R. Squibb & Sons, Inc., New York, N.Y.
No Drawing. Filed Oct. 26, 1970, Ser. No. 84,169
Int. Cl. C07d 99/16
U.S. Cl. 260—239.1         6 Claims

ABSTRACT OF THE DISCLOSURE

This invention relates to new acyloxymethyl esters of α-ureidocyclohexadienylalkylene-penicillins and compositions containing them which are useful as antibacterial agents.

SUMMARY OF THE INVENTION

This invention relates to new acyloxymethyl esters of α-ureido - (1,4 - cyclohexadien - 1 - yl)alkylene-penicillins of the formula:

(I)

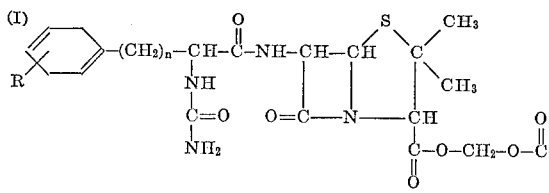

R represents hydrogen, lower alkyl or lower alkoxy, $R^1$ represents lower alkyl, monocyclic carbocyclic aryl or monocyclic carbocyclic aralkyl wherein the alkyl is lower alkyl of up to seven carbons, and $n$ represents 0, 1, 2, 3 or 4.

These symbols have the same meaning throughout this specification.

Preferred are those compounds wherein R is hydrogen and $n$ is 0 or 1, especially 0, and most especially those wherein $R^1$ is t-butyl or phenyl.

DETAILED DESCRIPTION OF THE INVENTION

The lower alkyl and lower alkoxy groups represented by the symbols include straight and branched chain hydrocarbon radicals of up to seven carbons such as methyl, ethyl, propyl, isopropyl, butyl, isobutyl, t-butyl, amyl, methoxy, ethoxy, propoxy, isopropoxy and the like. The aryl groups represented by $R^1$ are monocyclic carbocyclic aryl groups. The aralkyl groups represented by that symbol include an aryl group of the type just described attached to a lower alkyl of the type defined above. Thus acyloxymethyl esters like acetoxymethyl, propionyloxymethyl, isopropionyloxymethyl, butyryloxymethyl, pivaloyloxymethyl, valeroyloxymethyl, benzoyloxymethyl, phenacetyloxymethyl esters and the like are involved.

The new compounds of Formula I may be produced by a variety of methods from a 1,4-cyclohexadienyl-α-aminoalkanoic acid and 6 - amino-penicillanic acid (6-APA) or salts of these compounds. The carbamyl group may be introduced onto the α-amino group of the 1,4-cyclohexadienyl - α - aminoalkanoic acid before this substance is made to react with the 6-APA compound or at any stage after the coupling reaction. Similarly the acyloxymethyl group may be introduced onto the 6-APA moiety before its reaction with the 1,4-cyclohexadienyl-α-aminoalkanoic acid or at a later stage.

Preferably, the new compounds of Formula I are produced from either 6-aminopenicillanic acid (6-APA) or from an α-ureidocyclohexadienylalkylene-penicillin of the formula (II)

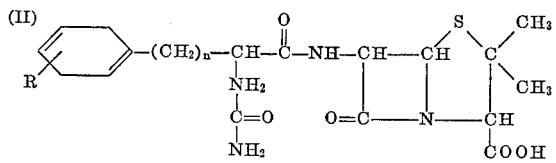

or a salt hereof, e.g., by a procedure adapted from the method of Daehne et al., Jour. Med. Chem. 13, 607 (1970), in which either the 6-APA or the penicillin of Formula II is reacted with a halomethyl ester (III)         $XCH_2OCOR^1$ wherein $R^1$ has the meaning already defined and X is a halogen, preferably chlorine or bromine.

The acid is treated with the halomethyl ester in a molar ratio of about 1:1 to 1:2 in an inert organic solvent like dimethylformamide, acetone, dioxane, benzene or the like at about ambient temperature or below.

The compound of Formula II may be used in the form of a salt, e.g., an alkali metal salt like sodium or potassium or an alkaline earth metal salt like calcium or magnesium or with an organic cation, e.g., methylammonium, triethylammonium, dimethylanilinium or the like.

In the case of the 6-APA, the 6-APA is preferably treated with an alkylamine like triethylamine and with the halomethyl ester. The resulting acyloxymethyl ester of 6-APA is then reacted with a cyclohexadienyl - α-ureidoalkanoic acid as described in more detail below.

The starting materials of Formua II are produced as described in copending application Ser. No. 877,478, filed Nov. 17, 1969, by coupling a cyclohexadienyl-α-aminoalkanoic acid, having the formula (IV)

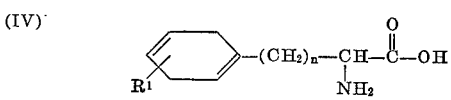

with a 6-aminopenicillanic (6-APA) compound of the formula (V)

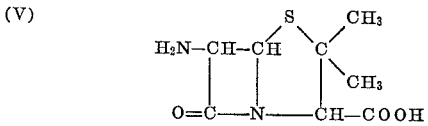

followed by carbamylation of the free amino group.

For an efficient process, an activated form of the compound of Formula IV is used. The amino group is best protected before coupling. Protecting groups which may be used to protect the amino group during the reaction of the acid compounds with the 6-APA compound include, for example triphenylmethyl, t-butoxycarbonyl, β,β,β-trichloroethoxycarbonyl, 4-oxo - 2 - pentenyl-2, 1-carbomethoxy-1-propenyl or the like. These are formed by reacting the acid of Formula II with a compound such as triphenylmethylchloride, t-butyl azidoformate, β,β,β-trichloroethyl chloroformate, acetylacetone, methylacetoacetate or the like. After the coupling reaction, if the protecting group is still present, it is removed, e.g., by treatment with aqueous acetic acid, trifluoroacetic acid, zinc-acid, or aqueous mineral acid, respectively, to give the compound with the free amino group. Alternatively, the amino group may be protected by protonation as the salt form before and during the subsequent coupling reaction.

The coupling is preferably effected by conversion of the acid to an activated form such as the acid chloride, bromide, azide, p-nitrophenyl ester or mixed anhydride, or by condensing in the presence of a carbodiimide such as dicyclohexylcarbodiimide.

The product of the coupling reaction having the formula (VI)

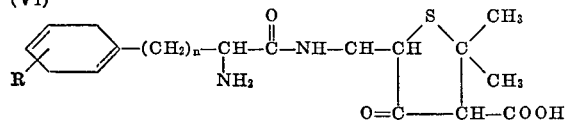

is carbamylated by treatment with a cyanate, e.g., an alkali metal cyanate, or with carbamyl phosphate to obtain the product of Formula II. This is accomplished by dissolving or suspending the compound of the above formula in aqueous medium and the cyanate or carbamyl phosphate is slowly added. Heat, e.g., up to about 80° C., may be applied to accelerate the reaction. The pH of the reaction mixture is preferably maintained in the acid range, e.g., about 5 to 6.9. The product may usually be precipitated by acidification and chilling.

According to another modification, a compound of Formula IV may first be carbamylated and then reacted with the ester of 6-APA. As still another modification the halomethyl ester of Formula III may be caused to react with a compound of Formula VI followed by carbamylation to give the desired products.

It will be appreciated that certain of the compounds of this invention exist in various states of solvation as well as in different optically active forms. The various forms as well as their mixtures are within the scope of this invention. Ordinarily the new penicillin derived from the D-form of the amino acid is more active than that derived from the L-form or the DL-form.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to penicillin G and other penicillins. For example, a compound of Formula I may be used in various animal species in an amount of about 1 to 200 mg./kg., daily, orally or parenterally, in single or two to four divided doses to treat infections of bacterial origin. By way of illustration the $PD_{50}$ orally in mice in a single administration is of the order of 5.0 mg./kg. against Streptococcus. The oral form gives a prompt high blood level which is maintained for relatively long periods.

Up to about 600 mg. of a compound of a compound of Formula I or a physiologically acceptable salt thereof may be incorporated in an oral dosage form such as tablets, capsules or elixirs or in an injectable form in a sterile aqueous vehicle prepared according to conventional pharmaceutical practice.

In cleaning or disinfecting compositions, e.g., in barns or dairy equipment, a concentration of about 0.01 to 1% by weight of such compounds admixed with, suspended or dissolved in conventional inert dry or aqueous carriers for application by washing or spraying may be used. They are also useful as nutritional supplements in animal feeds.

The following examples are illustrative of the invention. All temperatures are on the centigrade scale.

EXAMPLE 1

(a) D-2-amino-2-(1,4-cyclohexadienyl)acetic acid

A solution of 11.0 g. (72.7 mmole) of D-phenylglycine in 900 ml. distilled ammonia (which has been treated with 45 mg. lithium after distillation to destroy traces of moisture) is slowly diluted with 370 ml. dry t-butyl alcohol. Over a period of 2 hours, 165 g. lithium (3.27 eq.) is added in small portions until a permanent blue color is obtained. The blue reaction mixture is then treated with 38 g. of triethylamine hydrochloride. The ammonia is allowed to evaporate at room temperature overnight and the residual solvent is evaporated at reduced pressure. The white residue is taken up in a small amount of methanol-water and added to 4 l. of cold 1:1 chloroformacetone to precipitate the crude product. After 20 minutes stirring the suspension is filtered and the white filter cake is dried in vacuo; the filter cake is then pulverized and submitted once more to the precipitation process from 1:1 chloroform-acetone.

The white, crystalline product, 11.8 g., M.P. 297° (d), $[\alpha]_D -89.7°$ (2 N NaOH) is quantitatively obtained but is slightly contaminated with lithium chloride, 0.6% ionic chlorine being found by analysis.

(b) Methyl acetoacetic ester enamine of N-2-amino-2(1,4-cyclohexadienyl)acetic acid sodium salt 306 mg. D-2-amino-2-(1,4-cyclohexadienyl)acetic acid (2.00 mmoles) are dissolved by warming in a solution of 108 mg. of $NaOCH_3$ (2.00 mmoles) in 4.3 ml. reagent grade MeOH. 255 mg. (.24 ml.–2.20 mmoles) methyl acetoacetate are added and the mixture refluxed for 45 minutes. The MeOH is almost totally stripped off in vacuo. 5 ml. benzene are added and distilled off to a small residual volume. The addition and distillation of benzene is repeated to insure complete removal of the MeOH and water. The product crystallizes out overnight from a small residual volume of benzene. It is filtered off, washed with benzene and dried in vacuo. Yield: 463 mg.

(c) 6-[D-α-amino-(1,4-cyclohexadien-1-yl)acetamido] penicillanic acid and salts 358 mg. of 6-aminopenicillanic acid (1.66 mmoles) are stirred well in 2.5 ml. of water while 0.23 ml. triethylamine are gradually added with the pH kept under 8.0. Final pH is 7.4; 0.85 ml. acetone are added and the solution kept at —10°.

469 mg. methyl acetoacetate enamine of D-2-amino-2-(1,4 - cyclohexadinyl)acetic acid sodium salt (1.715 mmoles) are stirred in 4.25 ml. acetone at —20° C. a micro-drop of N-methylmorpholine is added followed by the slow addition of 198 mg. of ice cold ethyl chloroformate. Water, 0.43 ml. is added at this point and a turbid solution results. The reaction mixture is stirred for 10 minutes at —20° C.

The turbid solution of mixed anhydride is then added to the 6-APA solution. A complete solution is observed. The solution is stirred for 30 minutes at —10° C., then raised to room temperature, acidified to pH 2.0 with diluted HCl and, with good stirring, the pH is kept at that level for 10 minutes.

The solution is then extracted with 5 ml. xylene. The aqueous layer is layered with 5 ml. methyl isobutyl ketone and the pH adjusted to 5.0 with 1 N NaOH and chilled overnight. The resulting crystals of 6-[D-α-amino-(1,4-cyclohexadien - 1-yl)-acetamido]penicillanic acid hemihydrate are filtered off, washed with water and air dried, M.P. 202° C. (dec.)

The crystalline 6-[D-α-amino-(1,4-cyclohexadien-1-yl)-acetamido]penicillanic acid is suspended in 25 ml. of water and treated with an equivalent of aqueous potassium hydroxide (0.1 N) added with vigorous stirring. The solution is evaporated to dryness in vacuo at 25–30° C. to yield the potassium salt. The product is further purified by crystallization from aqueous acetone. The sodium salt is formed in the same manner using sodium hydroxide solution.

(d) 6-[D-2-ureido-(1,4-cyclohexadien-1-yl)acetamido] penicillanic acid and salts To a suspension of 300 mg. of 6-[D-2-amino-(1,4-cyclohexadien - 1-yl)acetamido]penicillanic acid hemihydrate in 7.0 ml. of water is added 600 mg. of potassium cyanate with stirring. The reaction mixture, which soon clears, is incubated at 22–24° C. and the pH maintained between 5.0 and 6.9 by frequent dropwise additions of 6.0 N hydrochloric acid with stirring. After five hours, the solution is chilled in an ice bath, acidified to pH 1.9 and 2.0 N hydrochloric acid, and the resulting precipitated product collected on a filter, washed with 10.0 ml. of cold water, and dried over calcium chloride in vacuo to yield 200 mg. of 6-[D-2-ureido-(1,4-cyclohexadien-1-yl)acetamido]penicillanic acid monohydrate, M.P. 174° (dec.).

The precipitated and washed 6-[D-2-ureido-(1,4-cyclohexadien-1-yl)acetamido]penicillanic acid is suspended in 25 ml. of water and treated with an equivalent of aqueous potassium hydroxide (0.1 N) added with vigorous stirring. The solution is evaporated to dryness in vacuo at 25–30° C. to yield 235 mg. of the potassium salt. The product is 75% pure by iodometric assay and is further purified by crystallization from aqueous acetone. The sodium salt is formed in the same manner using sodium hydroxide solution.

(e) Pivaloyloxymethyl ester of 6-[D-2-ureido-2-(1,4-cyclohexadien-1-yl)acetamido]penicillanic acid A solution of 4.2 gm. (0.01 mol.) of the sodium salt of 6 - [D-2-ureido-2-(1,4-cyclohexadien-1-yl)acetamido]penicillanic acid and 3.0 gm. (0.02 mol.) of chloromethylpivalate in 50 ml. of dimethylformamide under an inert ($N_2$) atmosphere is stirred for 24 hours. The reaction mixture is diluted with 500 ml. of ethyl acetate and the organic layer washed with 100 ml. each of 5% aqueous sodium bicarbonate, aqueous 1 N hydrochloric acid and water. The ethyl acetate layer is dried and evaporated to obtain the pivaloyloxymethyl ester of 6[DL-2-ureido-3-(1,4-cyclohexadienyl-1-yl)acetamido]penicillanic acid.

EXAMPLE 2

(a) DL-2-amino-3-(1,4-cyclohexadienyl)propionic acid 12.0 g. (72.7 mmole) of DL-phenylalanine are substituted for the D-phenylglycine in the procedure of Example 1a. The DL - 2 - amino - 3-(1,4-cyclohexadien-1-yl)propionic acid is obtained as a white powder.

(b) DL-2-ureido-3-(1,4-cyclohexadien-1-yl)propionic acid

A suspension of 1.0 g. of DL-2-amino-3-(1,4-cyclohexadien - 1 - yl)propionic acid in 10.0 ml. of water is treated with 0.59 g. of potassium cyanate and heated at 80° C. with stirring until a clear solution develops. The solution is cooled, incubated at 24° C. for 18 hours and then acidified with 2.0 N hydrochloric acid to precipitate DL - 2 - ureido - 3-(1,4-cyclohexadien-1-yl)propionic acid which is washed with cold water and dried over calcium chloride in vacuo.

(c) 6-[DL-2-ureido-3-(1,4-cyclohexadien-1-yl)propionamido]penicillanic acid sodium salt A solution of 490 mg. of DL-2-ureido-3-(1,4-cyclohexadien-1-yl)propionic acid and 125 mg. of sodium bicarbonate in 50 ml. of water is treated with a solution of 950 mg. of dicyclohexylcarbodiimide in 200 ml. of acetone. After stirring for 15 minutes at 24° C., 500 mg. of 6-aminopenicillanic acid is added slowly while stirring is continued. The reaction mixture is set aside for 3 hours at 24° C. and occasonally stirred during this time. The acetone is removed by evaporation at 10–20° C. at reduced pressure and the precipitated dicyclohexylurea is removed from the aqueous solution by filtration. The aqueous solution is acidified to pH 2.0 with 2.0 N hydrochloric acid and extracted with 4× 50 ml. of ethyl acetate. The ethyl acetate is washed with 4× 10 ml. of water adjusted to pH 2.0 with hydrochloric acid, dried with sodium sulfate, filtered and evaporated at 10–20° C. by reduced pressure to give the free acid as an amorphous white powder. The sodium salt is obtained by adding an equivalent amount of aqueous 0.1 N NaOH to a solution of the crude acid in 95% ethanol and evaporating the solution to precipitate the purified product as the sodium salt.

(d) Pivaloyloxymethyl ester of 6-[DL-2-ureido-3-(1,4-cyclohexadien-1-yl)propionamido]penicillanic acid A solution of 4.3 gm. (0.01 mol.) of the product of part c and 3.0 gm. (0.02 mol.) of chloromethylpivalate in 50 ml. of dimethylformamide are stirred for 24 hours under a nitrogen atmosphere. The reaction mixture is then diluted with 500 ml. of ethyl acetate. The organic layer which separates is washed with 100 ml. each of 5% aqueous sodium bicarbonate, aqueous 1 N hydrochloric acid and water. The ethyl acetate layer is dried and evaporated to obtain the pivaloyloxymethyl ester of 6-[DL-2-ureido-3-(1,4-cyclohexadienyl)propionamido]penicillanic acid.

EXAMPLE 3

By substituting 3.3 gm. of chloromethyl benzoate for the chloromethyl pivalate in the procedure of Example 1e, the benzoyloxymethyl ester of 6-[D-α-ureido-2-(1,4-cyclohexadien - 1 - yl)acetamido]penicillanic acid is obtained.

EXAMPLE 4

(a) D-2-amino-3-(4-methoxy-1,4-cyclohexadien-1-yl)propionic acid

By substituting 14.2 g. (72.7 mmole) of D-O-methyltyrosine for the phenylglycine in the procedure of Example 1a, D-2-amino-3-(4-methoxy-1,4-cyclohexadien-1-yl)propionic acid is obtained as a white crystalline product, M.P. 227° C., $[\alpha]_D^{20}$ —50.2°.

(b) Methyl acetoacetic acid ester enamine of D-2-amino-3-(4 - methoxy-1,4-cyclohexadien-1-yl)propionic acid sodium salt This product is obtained by substituting 390 mg. of D-2-amino - 3 - (4-methoxy-1,4-cyclohexadien-1-yl)propionic acid (2.00 mmole) in the procedure of Example 1b.

(c) 6-[D-amino-3-(4-methoxy-1,4-cyclohexadien-1-yl)propionamido]pencillanic acid By substituting 543 mg. (1.71 mmole) of the product of part b in the procedure of Example 1c, 6-[D-2-amino-3-(4-methoxy - 1,4 - cyclohexadien-1-yl)-propionamido]pencillanic acid is obtained.

(d) 6-[D-2-ureido-3-(4-methoxy-1,4-cyclohexadien-1-yl)propionamido]penicillanic acid By substituting the product of part c in the procedure of Example 1d, 6-[D-2-ureido-3-(4-methoxy-1,4-cyclohexadien-1-yl)propionamido]penicillanic acid is obtained.

(e) Pivaloyloxymethyl ester of 6-[D-2-ureido-3-(4-methoxy - 1,4 - cyclohexadien-1-yl)propionamido]penicillanic acid By substituting the product of part d in the procedure of Example 1e, the pivaloyloxymethyl ester of 6-[D-α-ureido - 3 - (4-methoxy-1,4-cyclohexadien-1-yl)propionamido]pencillanic acid is obtained.

EXAMPLE 5

By substituting DL-4-methoxyphenyl glycine for the phenyl glycine in part a and chloromethylacetate for the chloromethyl pivalate in part e and otherwise following the procedure of Example 1, the acetoxymethyl ester of 6-[DL-2-ureido - (4 - methoxy-1,4-cyclohexadien-1-yl)acetamido]penicillanic acid is obtained.

EXAMPLE 6

By substituting DL-4-methylphenyl glycine for the phenyl glycine in part a and following the procedure of Example 1 the pivaloyloxymethyl ester of 6-[DL-2-ureido-(4-methyl - 1,4 - cyclohexadien-1-yl)acetamido]penicillanic acid is obtained.

EXAMPLE 7

Pivaloyloxymethyl ester of 6-[D-(2-ureido-2-(1,4-cyclohexadien-1-yl)-acetamido]penicillanic acid A solution of 1.97 gm. (0.01 mol.) of D-(2-ureido-2-(1,4-cyclohexadienyl)acetic acid in 50 ml. 1:1 acetone-water is prepared by adding 1.0 gm. (0.01 mol.) of triethylamine to the suspension. The solution is then treated with 0.01 mol. of isobutyl chloroformate at −10° C. for 15 minutes. To this is then added a solution of 3.2 gm. (0.01 mol.) of the pivaloyloxymethyl ester of 6-aminopenicillanic acid in 50 ml. of acetone. The reaction mixture is stirred for 45 minutes and then allowed to come to room temperature. The solution is diluted with 500 ml. of ethyl acetate and washed successively with water, 0.1 N hydrochloric acid and 0.1 M sodium bicarbonate. The organic layer is dried and evaporated to deposit the product, the pivaloyloxymethyl ester of 6-[D-(2-ureido - 2 - (1,4-cyclohexadien-1-yl)-acetamido] penicillanic acid.

EXAMPLE 8

By substituting phenylacetoxymethyl chloride for the chloromethyl pivalate and substituting the sodium salt of 6-[DL - 2 - ureido-2-(2-t-butyl-1,4-cyclohexadien-1-yl) acetamido]penicillanic acid for the sodium salt of 6-[D-2-(1,4-cyclohexadien - 1 - yl)acetamido]penicillanic acid in Example 1e, the phenylacetoxymethyl ester of 6-[D-2-ureido-2-(2 - t - butyl-1,4-cyclohexadien-1-yl)acetamidopencillanic acid is obtained.

EXAMPLE 9

A sterile powder for reconstitution for use intramuscularly is prepared from the following ingredients which supply 1000 vials each containing 250 mg. of active ingredient:

```
                                                    Gm.
6 - [D - 2 - ureido-2-(1,4-cyclohexadien-1-yl)acet-
  amido  penicillanic acid pivaloyloxymethyl ester,
  sterile _____ 250
Lecithin powder, sterile _____ 50
Sodium carboxymethylcellulose, sterile _____ 20
```

The sterile powders are aseptically blended and filled into sterile vials and sealed. The addition of 1 ml. of water for injection to the vial provides a suspension for intramuscular injection.

EXAMPLE 10

The following ingredients are admixed:

```
                                                    Gm.
6 - [D - 2 - ureido-2-(1,4-cyclohexadien-1-yl)acet-
  amido]pencillanic acid pivaloyloxymethyl ester __ 250
Lactose _____ 56.9
Magnesium stearate _____ 3.1
```

The mixed ingredients are subdivided and filled into 1000 #2 gelatin capsules each containing a total of 310 mg. with 250 mg. of active substance.

EXAMPLE 11

Tablets are prepared from the following ingredients:

```
6 - [D - 2 - ureido-2-(1,4-cyclohexadien-1-yl)acet-
  amido]penicillanic acid pivaloyloxymethyl
  ester _____ kg__  5
Polyvinyl pyrrolidone _____ gm__ 360
Lactose _____ gm__ 780
Talc _____ gm__  80
Magnesium stearate _____ gm__  80
```

The active substance is mixed with the lactose and granulated with an ethanol solution of the polyvinyl pyrrolidone. The wet material is screened, then dried at 45°. The dried material is screened and admixed with the talc and magnesium stearate. The mixture is compressed in a tabletting machine to obtain 10,000 tablets weighing a total of 630 mg. each and containing 500 mg. of active ingredient.

What is claimed is:

1. A compound of the formula

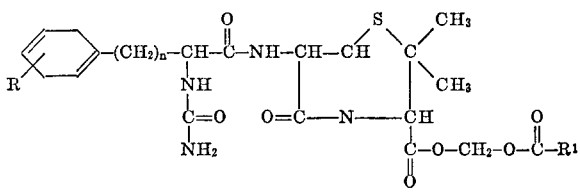

wherein R is hydrogen, lower alkyl or lower alkoxy, $R^1$ is lower alkyl, phenyl or phenyl-lower alkyl and $n$ is 0 or 1.

2. A compound as in claim 1 wherein R is hydrogen and $n$ is 0.
3. A compound as in claim 1 wherein $R^1$ is t-butyl.
4. A compound as in claim 2 wherein $R^1$ is t-butyl.
5. A compound as in claim 2 wherein $R^1$ is phenyl.
6. A compound as in claim 2 wherein $R^1$ is methyl.

References Cited
UNITED STATES PATENTS 3,485,819  12/1969  Weisenborn et al. ___ 260—239.1

NICHOLAS S. RIZZO, Primary Examiner

U.S. Cl. X.R.

424—271